E. S. GARDINER.
DRIP COFFEE POT.
APPLICATION FILED APR. 27, 1921.
1,389,299.
Patented Aug. 30, 1921.
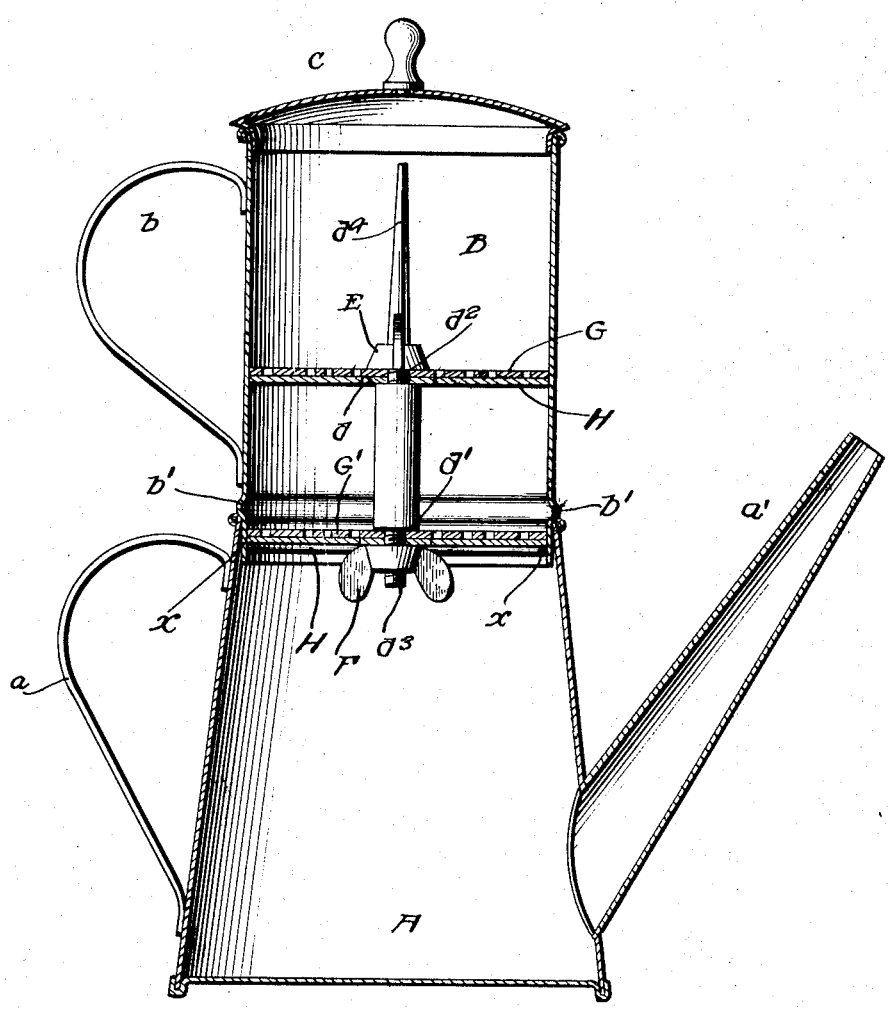
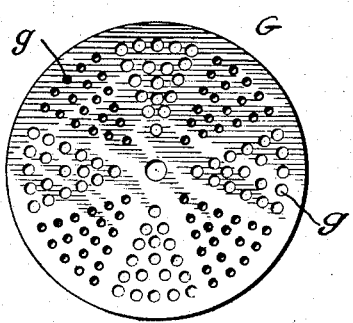
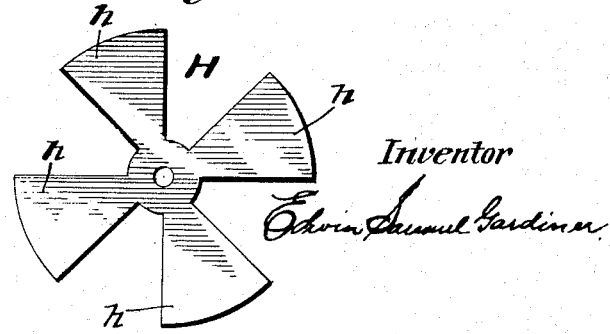
Inventor
Edwin Samuel Gardiner

UNITED STATES PATENT OFFICE.

EDWIN SAMUEL GARDINER, OF NEW ORLEANS, LOUISIANA.

DRIP-COFFEE POT.

1,389,299.  Specification of Letters Patent.  Patented Aug. 30, 1921.

Application filed April 27, 1921. Serial No. 465,045.

*To all whom it may concern:*

Be it known that I, EDWIN S. GARDINER, a citizen of the United States, residing in New Orleans, parish of Orleans, and State of Louisiana, have invented certain new and useful Improvements in Drip-Coffee Pots, of which the following is a specification.

This invention relates to coffee pots of the kind in which drip coffee is made and the primary object of the invention is to provide means whereby the ground or cut coffee may be so held as to permit a good infusion of the coffee to be quickly made in a very simple way. Another object of the invention is to so construct the coffee holder that it may be readily adjusted to contain coffee ground fine or coarse or steel cut in any usual way. A further object of the invention is to so construct the coffee holder that it may be readily taken apart, cleaned and reassembled.

In carrying out my invention I use a coffee pot of any usual or suitable construction made of any desired material, and I associate with the pot a receptacle for the coffee and for my improved device for holding the coffee. This device comprises a disk formed with perforations of different sizes, and which is associated with a cover plate which may be adjusted in such manner as to cover some of the perforations and expose others. Preferably two perforated plates are used, each being associated with a cover plate and these plates are held in place on a support by thumb nuts which may be tightened and loosened and which may be removed when desired to separate the parts for cleaning or other purposes.

In the accompanying drawings:—

Figure 1 shows a vertical central section through a coffee pot, coffee receptacle and coffee holder embodying my invention.

Fig. 2 is a top plan view of one of the perforated plates employed.

Fig. 3 is a top plan view of one of the cover plates used.

A coffee pot A of well known construction is provided with a handle $a$ and a spout $a'$. B indicates a receptacle for coffee and for the coffee holding devices. It is provided with a handle $b$ and with a bead $b'$ which rests on the beaded top of the pot A. The cover C is of the usual kind.

In order to hold the coffee in the receptacle B while boiling water is being poured into it, I provide a coffee holder which preferably comprises, as shown in the drawings, a support D which consists of a short cylinder shouldered at its opposite ends $d$, $d'$ and having threaded extensions $d^2$, $d^3$ to receive the thumb nuts E and F.

A perforated disk or plate G is mounted on the support D below the nut E, and between the disk and the shoulder $d$ is interposed a cover plate H. As shown in Fig. 2, the disk or plate G is formed with groups of perforations $g$ of different sizes. In this instance there are eight different groups and two different sizes of perforations, but these may be varied. Each group as shown is sector shaped but its shape is not essential. The cover plate is shown in Fig. 3 and comprises four sector shaped cover members $h$. The plate H is so formed that it may be made to completely cover at one time four of the groups of perforations in the plate G, but it may be made to cover partially eight of the groups of perforations.

In using the parts thus far described, the cover plate H is first placed on the spindle $d^4$ and lowered until it rests on the shoulder $d$. Then the perforated plate G is lowered on the spindle until it rests on the plate H. Then the thumb nut is applied, a proper adjustment is given to the plate and the thumb nut is tightened. By these devices the coffee holder may be adjusted for finely ground or for coarse ground or cut coffee.

Preferably I employ two perforated plates and two cover plates, the second set of plates being applied to the lower end of the support D. The second set of plates is indicated at G' and H' in Fig. 1. They are of the same construction and they are applied and adjusted in the same way as the plates G and H. The plate H' when in use rests on a bead or ledge $x$ in the lower part of the vessel B.

In using the invention, the plates H' and G' are first connected with the support D and they are given the desired adjustment. A supply of coffee is then placed in the receptacle B on top of the plates G'. Then the plates H and G are applied and a supply of coffee is placed in the receptacle B on the plate G. Then boiling water is poured into the receptacle and the cover C is applied. The process is continued in the usual way. It will be understood that before the coffee is placed in the holder, the plates are adjusted for different grades of ground or cut coffee and for other purposes.

It is of course necessary to clean the different parts of the coffee pot and holder frequently. This may be readily done in the coffee pot embodying my improvements. The vessels A and B are separable from each other, the cover C is of course detachable, and the holder as a whole can be withdrawn from the receptacle B. When thus withdrawn, by removing the nuts E and F, the plates G and H and G' and H' may be separated from their holder. All parts may be thoroughly cleaned and readily replaced.

I claim as my invention:

1. The combination with a coffee pot and a receptacle for coffee, of a coffee holder comprising a support, a plate formed with groups of perforations of different sizes, and a cover plate for covering some of the perforations and exposing others.

2. The combination with a coffee pot and a receptacle for coffee, of a coffee holder comprising a support, a plate formed with sector shaped groups of perforations of different sizes, and a cover plate having sector shaped members for covering some of the perforations in the first mentioned plate and exposing others.

3. A coffee holder for use in a coffee pot, comprising a support, a plate formed with sector shaped groups of perforations of different sizes alternately arranged, and a cover plate formed with sector shaped cover members for covering some of the perforations and exposing others.

4. A coffee holder for use with a coffee pot, comprising a support, a plate formed with groups of perforations of different sizes, a cover plate formed with covering members for the perforations, and means for holding the cover plate in different adjusted positions.

5. A coffee holder for use with a coffee pot, comprising a support, plates having groups of perforations of different sizes and applied to opposite ends of the support, cover plates for the perforated plates, and means for detachably connecting the perforated plates and the cover plates with their support.

6. The combination with a coffee receptacle, of a coffee holder comprising a support having shouldered opposite ends and threaded extensions, plates having groups of perforations of different sizes and which are applied to the ends of the support, cover plates having members for covering some of the perforations while exposing others, and means for securely fastening the several plates to their support.

7. The combination with a coffee receptacle, of a holder for the coffee, comprising a support having shouldered opposite ends and formed with threaded extensions, plates formed with sector shaped groups of perforations of different sizes and alternately arranged, cover plates having sector shaped members for covering some of the perforations while exposing others, and thumb nuts applied to the threaded extensions of the support for holding the several plates in place.

8. The combination with a coffee receptacle, of a coffee holder removably contained within said receptacle, comprising a centrally arranged support, plates having groups of perforations detachably secured to opposite ends of said support, and cover plates for different groups of perforations also detachably connected with said support.

EDWIN SAMUEL GARDINER.